J. H. GILMAN.
CONVEYING APPARATUS.
APPLICATION FILED JULY 10, 1908.
913,948.
Patented Mar. 2, 1909.
3 SHEETS—SHEET 1.
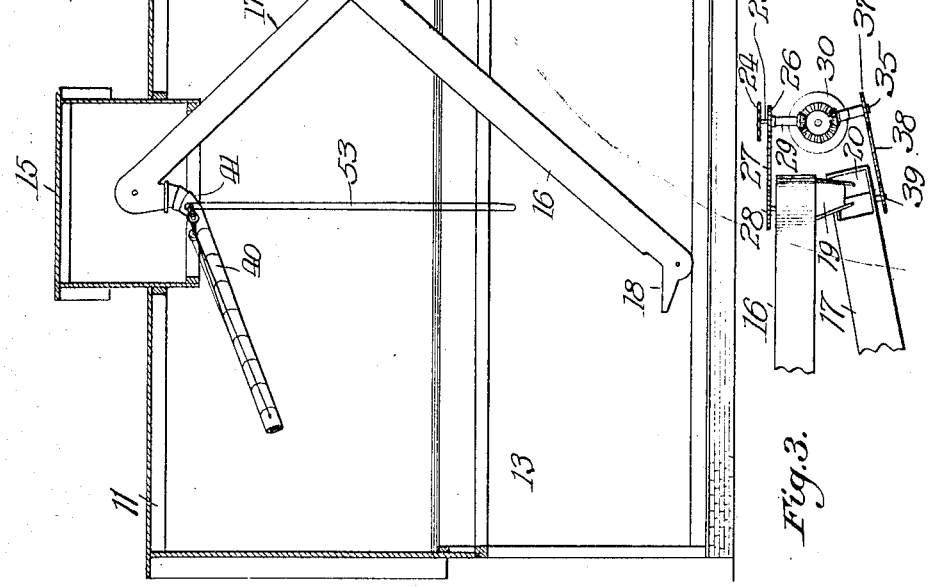
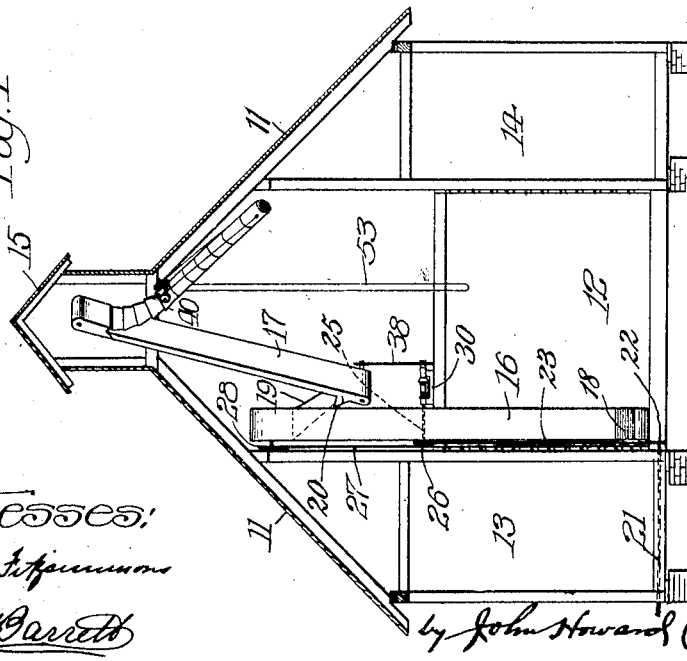
Witnesses:
Inventor:

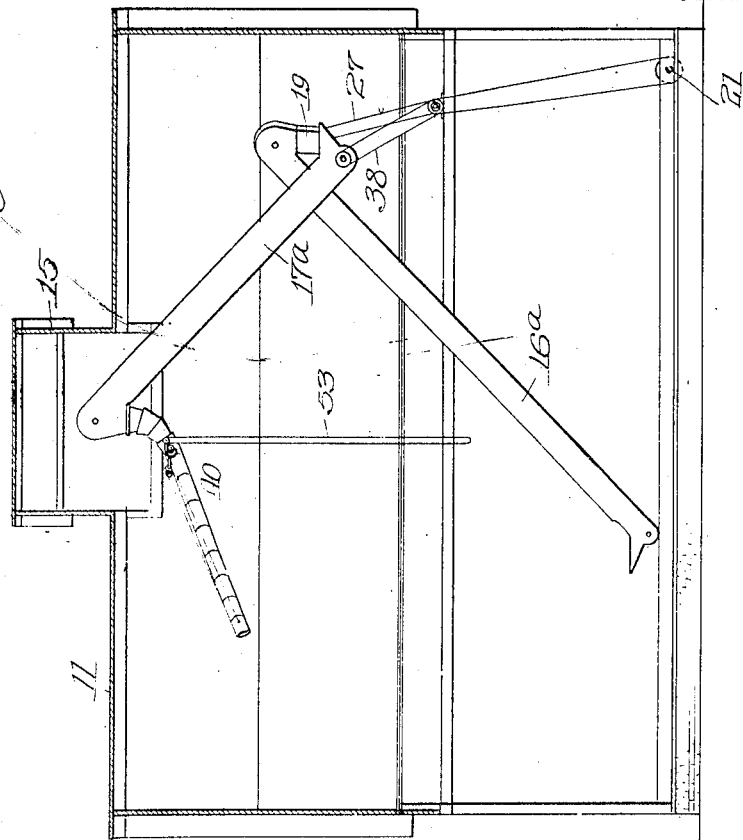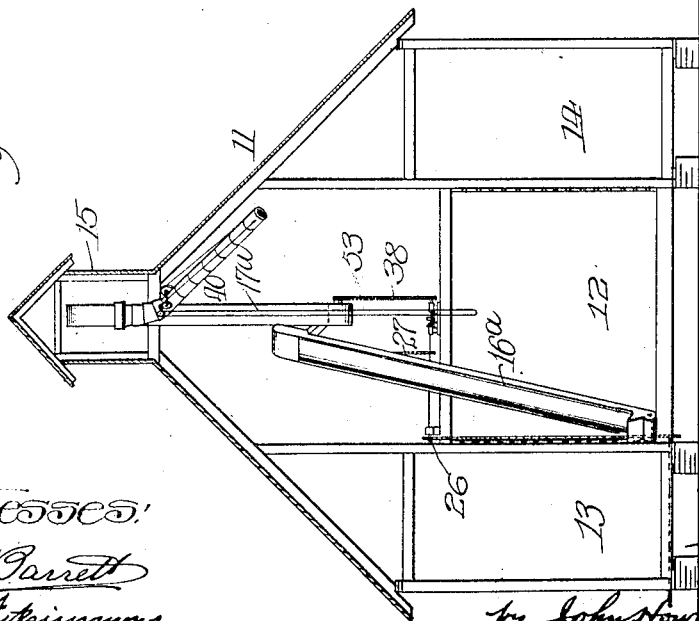

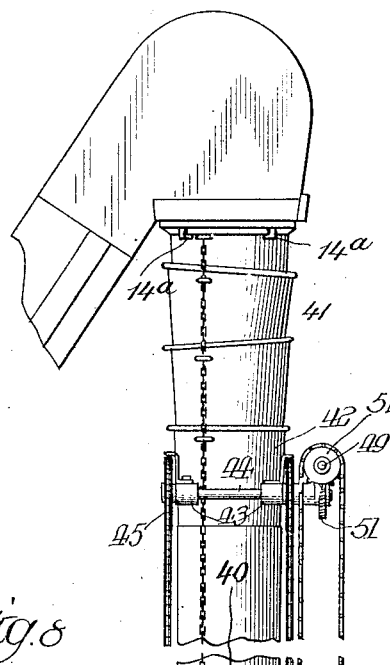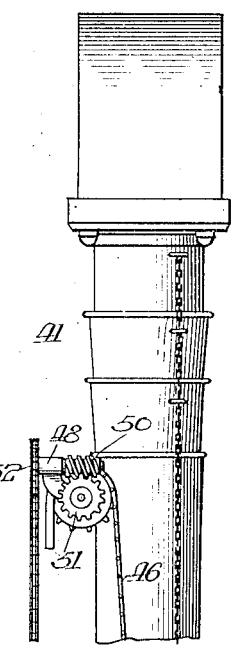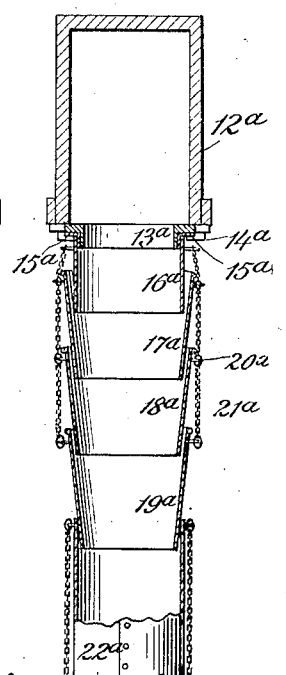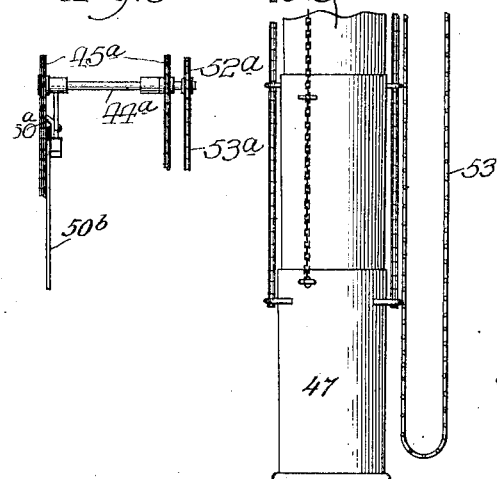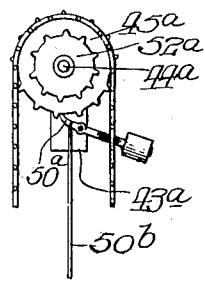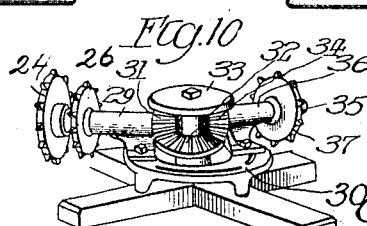

UNITED STATES PATENT OFFICE.

JOHN H. GILMAN, OF OTTAWA, ILLINOIS, ASSIGNOR TO KING & HAMILTON COMPANY, OF OTTAWA, ILLINOIS, A CORPORATION OF ILLINOIS.

CONVEYING APPARATUS.

No. 913,948.  Specification of Letters Patent.  Patented March 2, 1909.

Application filed July 10, 1908. Serial No. 442,941.

*To all whom it may concern:*

Be it known that I, JOHN H. GILMAN, a citizen of the United States, and a resident of Ottawa, in the county of Lasalle and State of Illinois, have invented certain new and useful Improvements in Conveying Apparatus, of which the following is a full, clear, and exact specification.

My invention is concerned with certain improvements in stationary elevating and conveying apparatus adapted to be placed in barns, and by which the grain hauled into the barn can be delivered from a single point to cribs located in any portion of the barn.

The structure embodying my present invention is an improvement on the one shown in Patent No. 837,053, granted November 27, 1906, to myself and Albert J. Bennett, and is designed to simplify and materially increase the efficiency and lessen the cost of such apparatus.

To illustrate my invention, I annex hereto three sheets of drawings, in which the same reference characters are used to designate identical parts in all the figures, of which,—

Figure 1 is an end elevation, partly in section, of the preferred form of my invention; Fig. 2 is a central longitudinal section through a barn containing my invention; Fig. 3 is a plan view showing the connection between the two sections of the crossed elevator; Figs. 4 and 5 are views similar to 1 and 2, but showing another form of my invention; Figs. 6 and 7 are side and end elevations of a portion of the spout, showing more especially how it may be extended and contracted from the floor of the barn; Figs. 8 and 9 are details showing a modification of the portion of the mechanism shown in Figs. 6 and 7; Fig. 10 is a detail in perspective showing the construction of the power jack between the two crossed sections of the elevator; Fig. 11 is a vertical section on the line A—A of Fig. 6.

Referring first to Figs. 1 and 2, 11 indicates a barn, which is of the customary construction, with the open driveway 12 through the center of the barn, and with the long cribs 13 and 14 on either side of the driveway. The barn is preferably provided with the cupola 15, as such a construction enables me to secure the same distribution of the grain without making the roof as a whole so high.

The object of my invention is to provide a suitable, simple elevating mechanism by which a load of corn or other grain driven into the barn and dumped at one particular point may be delivered to any portion of either of the cribs 13 and 14. To this end, suitable elevating apparatus is employed, and I employ one in which the lower elevator trough 16 crosses the upper elevator trough 17, as shown. These elevating troughs are of any ordinary construction, and contain continuous conveyers by which the grain which is dumped from the wagon into the hopper 18 of the lower leg will be carried up through the trough 16 and discharged from the upper end thereof through the cross spout 19 into the hopper 20 of the upper leg 17. It is essential that the end of the upper leg 17 terminate at the center of the top of the barn, and it is likewise essential that the lower leg 16 be located at one side of the passageway so as not to interfere with the wagon being driven into the barn. To secure this result, I may make the lower leg 16 extend parallel to the sides of the barn and incline the upper leg 17 as shown. Or I may incline the lower leg 16$^a$, as shown in Figs. 3 and 5, and have the upper leg 17$^a$ parallel with the sides of the barn. Or I might have both legs parallel with the sides of the barn, as shown in the aforesaid Gilman & Bennett Patent, No. 837,053, and employ a longer trough to connect the two sections than is shown in the aforesaid patent. As a convenient method for driving the elevator, I employ the shaft 21, which extends through one end of the barn and may be driven by any suitable source of power, such as a horse-power located outside of the barn. This shaft, by means of the sprocket wheel 22 and the chain 23 coöperating with the sprocket wheel 24, drives the shaft 25. A sprocket wheel 26 on this shaft 25, by means of the sprocket chain 27 and the sprocket wheel 28 on the shaft in the upper end of the leg 16, drives the conveyer belt in said leg. The shaft 25 is journaled in a suitable bearing 29 secured on the base 30 of the power jack, best shown in Fig. 10, and has a bevel gear pinion 31 meshing with bevel gear disks 32 and 33 of said jack, with which meshes a bevel gear pinion 34 secured on a shaft 35 mounted in a bearing 36 which is adjustably mounted on the base 30, so that, by the connection shown, the sprocket wheel 37 on the end of the shaft 35 can be set at any desired angle to the sprocket wheel 26, which drives the lower leg of the conveyer. This jack mechanism has to be interposed in order that the two legs 16 and 17 may have different angles to the sides of the barn, as illustrated. The sprocket wheel 37 is connected by the sprocket chain 38 with the sprocket wheel 39 connected to the shaft in the lower end of the leg 17 by which the conveying mechanism in the leg 17 is driven.

By the mechanism thus far described, the grain dumped into the hopper 18 is delivered to the top of the leg 17, which terminates in the upper portion of the central part of the barn and in the cupola 15, where such cupola is provided. The upper end of the section 17 has swiveled thereon the telescoping spout 40, which may be of any desired construction, but which is preferably like that shown in my Patent No. 883,109, granted March 24, 1908. This spout has the flexible elbow-portion 41, and the extensible main body-portion, so that it can be directed, as shown, to discharge the corn delivered into it by the crossed elevator sections 16 and 17 to any portion of the cribs 13 and 14. This spout comprises the head 12ª, which has secured on its discharge end the downwardly projecting annular flange 13ª, through which end 12ª pass the hooks 14ª, which can be turned into and out of position to engage with a horizontal annular flange 15ª, which is preferably formed from a strip of angle iron secured to the interior of the uppermost section 16ª, which is of cylindrical form and of sheet metal. The adjacent sections 17ª, 18ª and 19ª form the elbow portion 41 of the spout, and are conical in shape, so that the spout can be flexed at this point in the customary manner. In order to telescope these sections, they are provided on each side with the rings 20ª, to which the chains 21ª are secured, as is customary in this class of devices. To the lowermost conical section 19ª is preferably rigidly secured the uppermost cylindrical section 22ª, which forms the first section of the straight portion of the spout. In connection with this telescoping spout, I preferably provide some means by which the sections can be extended or retracted, as may be desired, from the floor of the barn, and for this purpose I preferably employ the construction shown in Figs. 6 and 7, where it will be seen that I secure to the uppermost one 42 of the straight sections the bearings 43 for the transverse shaft 44, which has at its ends the sprocket wheels 45, over which pass the sprocket chains 46, the lower ends of which are secured to the lowermost section 47. To turn this shaft 44 and at the same time hold it in any position to which it may be turned, I secure on one of the bearings 43 the transverse bearing 48, in which is located a worm shaft 49 which carries at one end a worm 50 meshing with a worm gear 51 on the end of the shaft 44, and the other end of which is provided with a sprocket wheel 52 over which runs an endless sprocket chain 53 which extends downward to the floor. By manipulating the chain 53, it will be evident that the shaft 49 may be rotated, and it in turn will rotate the shaft 44 by which the sprocket chains 46 may be drawn over the sprocket wheel 45 to raise or lower the lower section 47, thereby shortening or lengthening the spout as the sections thereof telescope in the customary manner. Of course, it will be understood that I might substitute drums and ropes for the sprocket wheels 45 and the sprocket chains 46.

In Figs. 8 and 9, I have illustrated a somewhat simplified form of mechanism for controlling the telescoping of the spout from the floor, and in this form the chain 53ª is run over a wheel 52ª, which is located directly on the shaft 44ª carrying the sprocket wheels 45ª. To hold the shaft 44ª in the position to which it may be turned by the sprocket chain, I employ the gravity detent pawl 50ª, which is pivotally mounted on the bracket casting 43ª, and engages the teeth of one of the sprocket wheels 45ª and can be pulled out of engagement by means of the rope 50ᵇ attached thereto and extending to the floor of the barn.

The modified form shown in Figs. 4 and 5 will be understood to be the same as that shown in Figs. 1 and 2, except that the lower leg 16ª is inclined to the side of the cribs, instead of the upper leg, and that the adjustments of the power jack are changed accordingly.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a device of the class described, the combination with a barn having a central driveway and cribs, of an elevator having the receiving end in the driveway and the discharging end in the center of the top of the barn, and a swiveled spout into which the elevator discharges to deliver the elevated material to any of the cribs.

2. In a device of the class described, the combination with a barn having a central driveway and cribs, of an elevator having the receiving end in the driveway and the discharging end in the center of the top of the barn, and a swiveled and extensible spout into which the elevator discharges to deliver the elevated material to any of the cribs.

3. In a device of the class described, the combination with a barn having a central driveway and cribs, of an elevator having the receiving end in the driveway and the discharging end in the center of the top of the barn, and a swiveled, extensible and flexible spout into which the elevator discharges to deliver the elevated material to any of the cribs.

4. In a device of the class described, the combination with a barn having a central driveway and cribs, of an elevator having crossed sections, the receiving end of the lower section being located in the driveway and the discharging end of the upper section in the center of the top of the barn, and a swiveled spout in which the elevator discharges to deliver the elevated material to any of the cribs.

5. In a device of the class described, the combination with a barn having a central driveway and cribs, of an elevator having crossed sections, the receiving end of the lower section being located in the driveway and the discharging end of the upper section in the center of the top of the barn, and a swiveled and extensible spout into which the elevator discharges to deliver the elevated material to any of the cribs.

6. In a device of the class described, the combination with a barn having a central driveway and cribs, of an elevator having crossed sections, the receiving end of the lower section being located in the driveway and the discharging end of the upper section in the center of the top of the barn, and a swiveled, extensible and flexible spout into which the elevator discharges to deliver the elevated material to any of the cribs.

7. In a device of the class described, the combination with a barn having cribs, of an elevator having its discharging end in the center of the top of the barn, a swiveled and extensible spout into which the elevator discharges to deliver the elevated material to any of the cribs, and means for manipulating the spout from a point at a distance therefrom.

8. In a device of the class described, the combination with a barn having cribs, of an elevator having its discharging end in the center of the top of the barn, a swiveled and extensible spout into which the elevator discharges to deliver the elevated material to any of the cribs, and means for manipulating the spout from a point at a distance therefrom, consisting of a shaft having winding elements secured thereon and journaled on a section of the spout near the upper end thereof, members wound on said elements and secured to the lowermost spout section, and means for rotating said shaft from a distance.

9. In a device of the class described, the combination with a barn having cribs, of an elevator having its discharging end in the center of the top of the barn, a swiveled and extensible spout into which the elevator discharges to deliver the elevated material to any of the cribs, and means for manipulating the spout from a point at a distances therefrom, consisting of a shaft having winding elements secured thereon and journaled on a section of the spout near the upper end thereof, members wound on said elements and secured to the lowermost spout section, and means for rotating said shaft from a distance, said means consisting of a sprocket chain coöperating with a sprocket wheel secured on a shaft operatively connected with the winding shaft.

10. In a device of the class described, the combination with a barn having a central driveway and cribs, of an elevator having crossed sections, the lower section having its receiving end in the driveway and the upper section having its discharging end in the center of the barn, one of said sections being parallel to the sides of the driveway and the other at an angle thereto, a single driving means coöperating with both sections, and a swiveled spout into which the elevator discharges to deliver the elevated material to any of the cribs.

11. In a device of the class described, the combination with a barn having a central driveway and cribs, of an elevator having crossed sections, the lower section having its receiving end in the driveway and the upper section having its discharging end in the center of the barn, one of said sections being parallel to the sides of the driveway and the other at an angle thereto, a single driving means coöperating with both sections, and a swiveled and extensible spout into which the elevator discharges to deliver the elevated material to any of the cribs.

12. In a device of the class described, the combination with a barn having a central driveway and cribs, of an elevator having two crossed sections, the lower one of said sections being parallel to the sides of the driveway and the upper one being at an angle thereto and having its discharging end in the center of the top of the barn, a single driving means for operating both sections, and a swiveled spout into which the elevator discharges to deliver the elevated material to any of the cribs.

13. In a device of the class described, the combination with a barn having a central driveway and cribs, of an elevator having two crossed sections, the lower one of said sections being parallel to the sides of the driveway, and the upper one being at an angle thereto and having its discharging end in the center of the top of the barn, a single driving means for operating both sections, and a swiveled and extensible spout into which the elevator discharges to deliver the elevated material to any of the cribs.

14. In a device of the class described, the combination with a barn having a central driveway and cribs, of an elevator having crossed sections, one of said sections being parallel to the side of the driveway, and the other at an angle thereto to bring the discharge end to the center of the top of the barn, a single driving means for operating both sections, said means including a power jack to drive the two shafts at an angle to each other, and a swiveled spout into which the elevator discharges to deliver the elevated material to any of the cribs.

15. In a device of the class described, the combination with a barn having a central driveway and cribs, of an elevator having crossed sections, one of said sections being parallel to the side of the driveway and the other at an angle thereto to bring the discharge end to the center of the top of the barn, a single driving means for operating both sections, said means including a power jack to drive the two shafts at an angle to each other, and a swiveled and extensible spout into which the elevator discharges to deliver the elevated material to any of the cribs.

16. In an apparatus of the class described, the combination with a barn having a plurality of cribs disposed about a central point, of an elevator having the receiving end on the level of the floor of the barn and the discharging end in the center of the top of the barn, and a swiveled spout into which the elevator discharges to deliver the elevated material into any desired one of the cribs.

17. In an apparatus of the class described, the combination with a barn having a plurality of cribs disposed about a central point, of an elevator having the receiving end on the level of the floor of the barn and the discharging end in the center of the top of the barn, and a swiveled and extensible spout into which the elevator discharges to deliver the elevated material to any desired portion of any one of the cribs.

18. In an apparatus of the class described, the combination with a barn having a plurality of cribs disposed about a central point, of an elevator having the receiving end on the level of the floor of the barn and the discharging end in the center of the top of the barn, and a swiveled, extensible and flexible spout into which the elevator discharges to deliver the elevated material at any desired height in any desired portion of any one of the cribs.

In witness whereof, I have hereunto set my hand and affixed my seal, this 25th day of June A. D. 1908.

JOHN H. GILMAN. [L. S.]

Witnesses:
 EDWARD R. CLAUS,
 GEO. C. RICKLY.